(12) United States Patent
Chen

(10) Patent No.: US 9,862,228 B1
(45) Date of Patent: Jan. 9, 2018

(54) CASTER STRUCTURE

(71) Applicant: Frank Chen, Miaoli Hsien (TW)

(72) Inventor: Frank Chen, Miaoli Hsien (TW)

( * ) Notice: Subject to any disclaimer, the term of this patent is extended or adjusted under 35 U.S.C. 154(b) by 0 days.

(21) Appl. No.: 15/485,286

(22) Filed: Apr. 12, 2017

(51) Int. Cl.
*B60B 33/00* (2006.01)

(52) U.S. Cl.
CPC ........ *B60B 33/006* (2013.01); *B60B 33/0057* (2013.01); *B60B 33/0068* (2013.01); *B60B 2380/12* (2013.01); *Y10T 16/186* (2015.01)

(58) Field of Classification Search
CPC .............. B60B 33/006; B60B 33/0057; B60B 33/0068; B60B 2380/12; B60B 33/0007; B60B 33/0002; Y10T 16/186; Y10T 16/1867; Y10T 16/1873; Y10T 16/1877; Y10T 16/203; Y10T 16/19; Y10T 16/18
USPC .............................. 16/20–23, 31 R, 29, 18 R
See application file for complete search history.

(56) References Cited

U.S. PATENT DOCUMENTS

| | | | | |
|---|---|---|---|---|
| 5,263,226 A * | 11/1993 | Roy | ...................... | B60B 33/021 16/20 |
| 5,287,594 A * | 2/1994 | Hicks | .................. | B60B 33/0002 16/20 |
| 6,698,060 B1 * | 3/2004 | Lee | ........................ | B60B 3/001 16/20 |
| 7,383,611 B2 * | 6/2008 | Foster | ................. | B60B 33/0039 16/20 |
| 2004/0060149 A1 * | 4/2004 | Chang | ................. | B60B 33/0002 16/20 |
| 2006/0156511 A1 * | 7/2006 | Li | ....................... | B60B 33/0007 16/20 |
| 2006/0200937 A1 * | 9/2006 | Ruckman | .............. | B60B 33/001 16/20 |
| 2008/0148514 A1 * | 6/2008 | Hancock | ............. | B60B 33/0007 16/21 |
| 2016/0339741 A1 * | 11/2016 | Redington | ............ | B60B 33/006 |

FOREIGN PATENT DOCUMENTS

| TW | M349338 U | 1/2009 |
|---|---|---|
| TW | M364616 U | 9/2009 |

* cited by examiner

*Primary Examiner* — William Miller
(74) *Attorney, Agent, or Firm* — Alan D. Kamrath; Kamrath IP Lawfirm, P.A.

(57) ABSTRACT

A caster structure has a screw hole formed at the middle of a carrying plate and provided for passing, screwing, and pressing a screw, and then screwing and pressing tightly with a nut, so that the installed screw has a smaller thickness to lower the center of gravity of an installed wheel in addition to giving a dual nut fixing effect. The caster has bearings which are mainly thrust bearings for bearing a relatively larger axial gravity to prevent the bearing from being damaged by gravity and the balls from falling out. The bearings are limited and positioned securely to prevent installation gaps and dusts, to maintain a flexible rotation of the caster.

6 Claims, 4 Drawing Sheets

CASTER STRUCTURE

BACKGROUND OF THE INVENTION

Field of the Invention

The present invention relates to a caster structure and, more particularly, to the caster passing through the screws of different parts to prevent loosening the screws and providing a safe fixing effect by dual nuts. The screws have a small assembling thickness. Thus, the center of gravity of a bed surface of a cart is lowered to provide a more stable movement when the cart is pushed, and the bearing is limited and positioned to protect and prevent the components of the bearing from falling off and to provide a dust-resisting effect.

Description of the Related Art

A caster structure is disclosed in R.O.C. Pat. No. M349338 (hereinafter referred to as Prior Art 1) and R.O.C. Pat. No. M364616 (hereinafter referred to as Prior Art 2). In the Prior Arts 1 and 2, a screw is passed through components of a caster, and the rear end of the screw is fixed by a nut in order to connect the components securely. However, the screw is fixed by a single nut, and a heavy object is usually carried at the bottom of the cart. Thus, their bonding strength is relatively insufficient. The bearings adopted by the Prior Arts 1 and 2 are ball bearings. The application of the ball bearing has a larger lateral bearing stress, and a weaker axial bearing stress. When the ball bearing is applied to the caster with an axial load, inner and outer rings of the ball bearing are often damaged by the large vertical pressure, and the balls may even fall out. As a result, the cart may be stuck to cause an unsmooth movement of the cart.

In view of the aforementioned drawbacks of the conventional casters, a feasible design is provided to overcome the drawbacks of the prior art.

SUMMARY OF THE INVENTION

Therefore, it is a primary objective of the present invention to provide a caster passing through the screws of different components to provide a safe fixing effect and to prevent the screws from being loosened similar to a dual-nut effect. The installed screw has a small thickness to lower the center of gravity of a bed surface of a cart, to provide a stable movement when the cart is pushed. The bearing is one capable of bearing a relatively large axial force, and the bearing is limited and positioned during the installation to protect the components, to prevent the bearing from falling out, and to provide an anti-dust effect.

To achieve the aforementioned object, the present invention provides a caster having a carrying plate installed at the top of the caster, a screw hole formed at the middle of the carrying plate for passing a screw from bottom to top through different components and then screwing and connecting with a nut, and a stop structure for limiting and stopping the nut and the rear end, so that the nut cannot be rotated anymore. Therefore, the invention stops the rear end of the screw by the effect similar to a dual-nut effect to prevent the components from being loosened and to provide a safe fixing effect.

The present invention is also characterized in that the bearing is a thrust bearing which has a large axial force to bear a larger axial load of the cart and to prevent the bearing from being damaged by the axial load or falling out. The bearing is embedded into a concave cavity of the caster and adjacent stacked components to reduce the installation gap of the bearing and to provide an anti-dust effect of the bearing.

The technical characteristics, contents, advantages and effects of the present invention will be apparent with the detailed description of preferred embodiments accompanied with related drawings as follows.

DETAILED DESCRIPTION OF THE PREFERRED EMBODIMENTS

Figure 1:
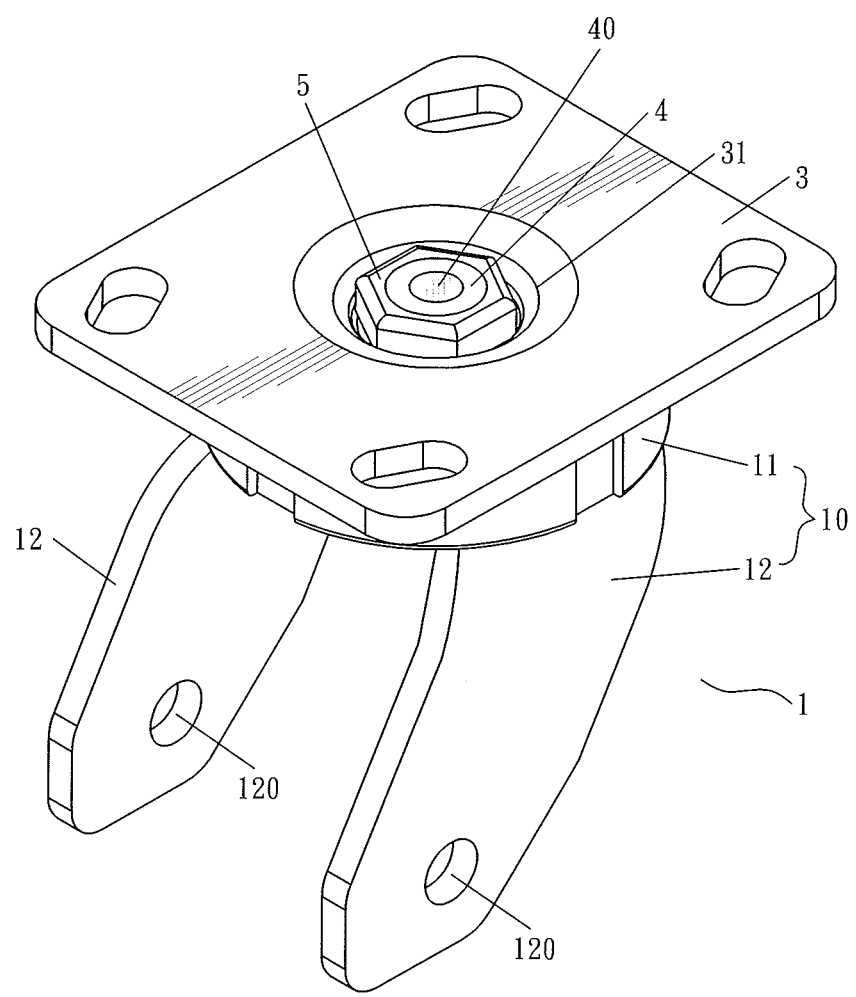
FIG. 1 is a perspective view of a caster structure in accordance with a preferred embodiment of the present invention.
Figure 2:
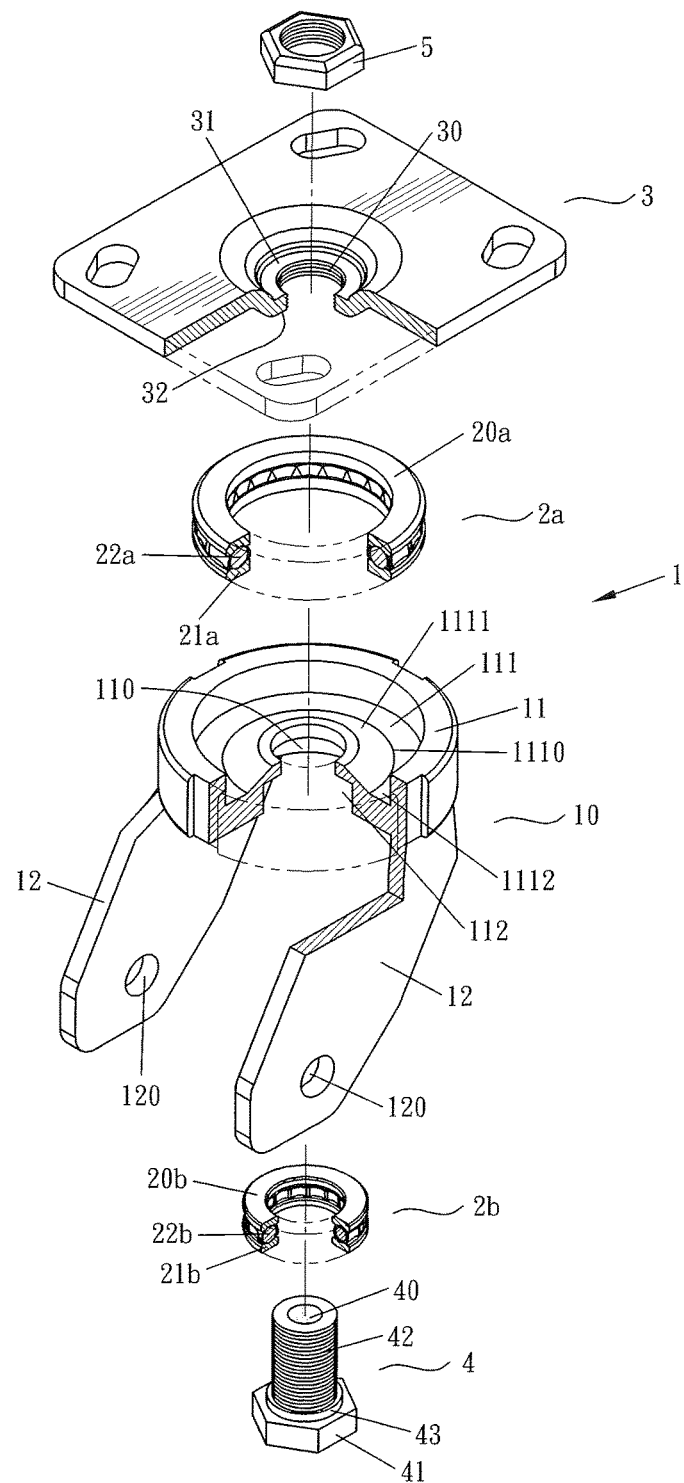
FIG. 2 is an exploded view of a caster structure in accordance with a preferred embodiment of the present invention.
Figure 3:
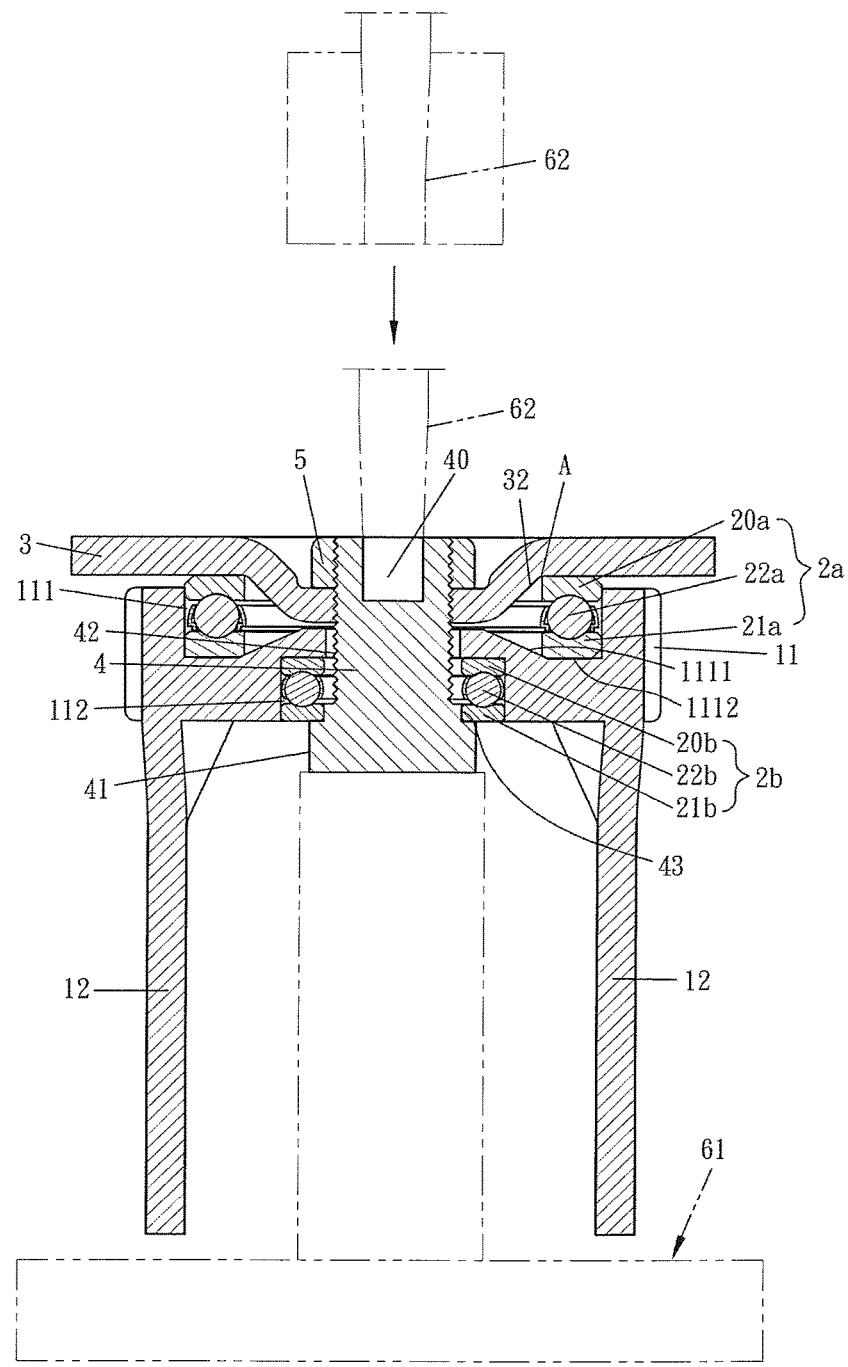
FIG. 3 is a front sectional view of a caster structure in accordance with a preferred embodiment of the present invention.
Figure 4:
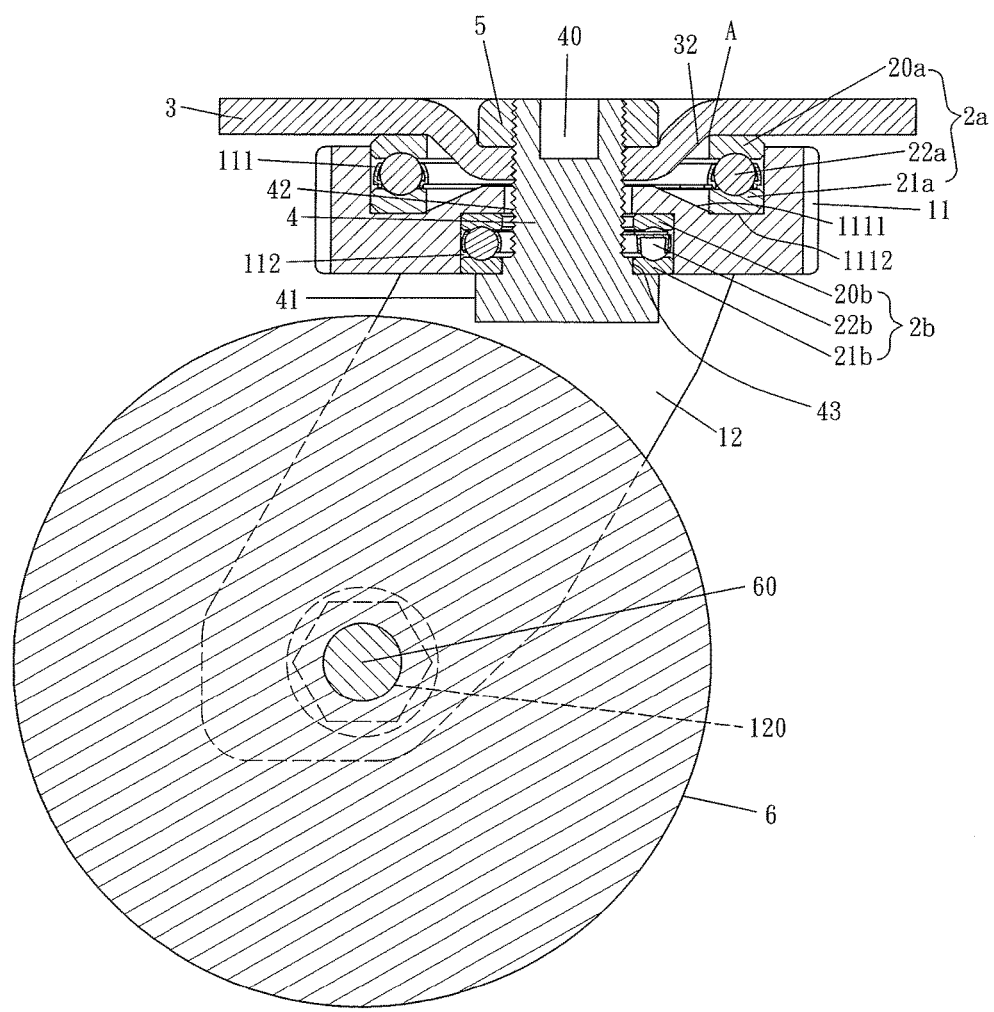
FIG. 4 is a side sectional view of a caster structure installed with a wheel in accordance with a preferred embodiment of the present invention.

With reference to FIGS. 1 to 3 for a caster in accordance with a preferred embodiment of the present invention, the caster 1 comprises the following elements:

A bipod 10 includes a main body 11 and two support legs 12. A through hole 110 is formed at the middle of the main body 11, an upper cavity 111 is downwardly and concavely formed on a top side of the main body 11 and concentrically configured with the through hole 110, and a lower cavity 112 upwardly and concavely formed on a bottom side of the main body 11 and concentrically configured with the through hole 110. A protrusion 1111 is formed between a middle position 1110 on an internal bottom side of the upper cavity 111 and the edge of the through hole 110, so that a limiting interval 1112 is formed on the internal bottom of the upper cavity 111 and from the middle position 1110 to the inner wall on a side of the upper cavity 111. The support leg 12 is fixed to the bottom side of the main body 11 and is disposed on both left and right sides separately. The top end of the support leg 12 is fixed (soldered) with the main body 11, the bottom end of the support leg 12 is extended downwardly and obliquely, and the bottom end of the support leg 12 has a pivot hole 120 for installing a wheel 6 (as shown in FIG. 4) between the two support legs 12. Both left and right ends of a shaft 60 of the wheel 6 are passed into the pivot holes 120 respectively to achieve the locking and fixing effects.

An upper bearing 2a and a lower bearing 2b are thrust bearings. The upper bearing 2a is installed in the upper cavity 111. The upper bearing 2a has an external diameter matched with the internal diameter of the upper cavity 111, and the inner and outer sides of the bottom of the upper bearing 2a are limited and positioned by the limiting interval 1112 (as shown in FIG. 3). The lower bearing 2b is embedded into the lower cavity 112, and the lower bearing 2b has an external diameter matched with the internal diameter of the lower cavity 112, so that the outer wall of the lower bearing 2b abuts the internal sidewall of the lower cavity 112. The upper bearing 2a and the lower bearing 2b have the same structure comprising an upper ring 20a(20b) in a hollow circular form and arranged in upper and lower rows, a lower ring 21a(21b) disposed under the upper ring 20a (20b), and a plurality of balls 22a(22b) installed between the upper ring 20a(20b) and the lower ring 21a(21b). The installation of the upper bearing 2a and the lower bearing 2b maintains a flexible rotation of the bipod 10 and the wheel 6 to the left and right sides.

A carrying plate 3 is installed at the top of the main body 11 and provided for covering the upper cavity 111 and locking and fixing a bed surface of the bottom end of the cart. A screw hole 30 is formed at the middle position of the carrying plate 3 and configured to be corresponsive to the through hole 110. A groove 31 is downwardly and concavely formed on a top side of the carrying plate 3 and disposed at a peripheral surface of the screw hole 30. A conical abutting surface 32 is protruded downwardly from the bottom side of the carrying plate 3 and configured to be corresponsive to the groove 31 (or disposed on at the periphery of the screw hole 30). The bottom side of the carrying plate 3 covers the top side of the upper bearing 2a, and the middle portion of the abutting surface 32 may be embedded into the upper bearing 2a. A portion of the abutting surface 32 is pressed by a top end A of the inner wall of the upper ring 20 of the upper bearing 2a as shown in FIG. 3.

A screw 4 is passed from bottom to top and sequentially through the lower bearing 2b, the through hole 110 and the upper bearing 2a. Then the rear end of the screw 4 and the screw hole 30 of the carrying plate 3 are screwed and pressed tightly with each other. Since the carrying plate 3 has the screw hole 30, a function similar to a nut is provided, so that after the screw 4 is screwed all the way into the screw hole 30 of the carrying plate 3, the rear end of the screw 4 is passed upwardly out from the top of the screw hole 30. A nut 5 is screwed with the rear end of the screw 4, so that the nut 5 is disposed adjacent to press the carrying plate 3 tightly. After the nut 5 is pressed tightly and embedded into the groove 31, the top end of the nut 5 and the rear end of the screw 4 are aligned precisely with the top side of the carrying plate 3 as shown in FIG. 3, and the screw 4 connects different components of the caster 1. Finally, a stop structure is provided for limiting and stopping the nut 5 and the rear end of the screw 4, so that the nut 5 will not be rotated anymore. The stop structure is formed by having a concave hole 40 formed at the rear end of the screw 4, and extending a punching rod 62 of a punching machine 61 into the concave hole 40 to expand the concave hole 40, so that the outer wall of the concave hole 40 expands to latch the nut 5, so that the nut 5 is stuck and cannot be rotated anymore to prevent the screw 4 and the nut 5 from being loosened. In addition, the screw 4 has a head 41 with an external diameter greater than the internal diameter of the lower bearing 2b, so that the head 41 has an effect of supporting and sealing the bottom end of the lower bearing 2b. The outer wall of a limit ring 43 between the head 41 and a starting position of a threaded section 42 is a smooth surface, and the limit ring 43 has an external diameter matched with the internal diameter of the lower ring 21b of the lower bearing 2b, so that the limit ring 43 and the internal side wall of the lower cavity 112 can laterally abut the inner and outer sidewalls of the lower ring 21b to position the lower bearing 2b tightly.

After the aforementioned elements are combined sequentially as shown in FIGS. 1 and 3, the caster 1 and wheel 6 are coupled as shown in FIG. 4. The application of the present invention has the following advantages and effects.

1. The carrying plate 3 has a screw hole 30, so that when the screw 4 is passed from bottom to top to lock and connect each component, a dual-nut effect is achieved for the screw hole 30 of the carrying plate 3 formed at the rear end of the screw 4 and the nut 5. In addition, the stop structure is provided for limiting the rotation of the nut 5 to prevent the screw 4 from being loosened and to improve the safety of use.

2. The outer walls of the upper bearing 2a and the lower bearing 2b are abutted by the inner walls of the upper cavity 111 and the lower cavity 112 respectively, and the lower end, the upper end and the hollow inner wall of the upper bearing 2a are abutted by the protrusion 1111 and the abutting surface 32 respectively (as shown in FIG. 3), so that both inner and outer peripheral surfaces of the upper bearing 2a are abutted and so that no gaps will be formed. The bottom side of the lower bearing 2b is supported by the head 41 of the screw 4, the inner wall of the lower ring 21b is abutted by the outer wall of the limit ring 43, and the upper ring 20b is attached closely with the internal bottom of the lower cavity 112, so that the lower bearing 2b is positioned securely and so that no gaps will be formed. Such arrangement provides an excellent seal after the upper bearing 2a and the lower bearing 2b are positioned, to prevent dust from sticking onto the balls or hindering the flexible rotation of the caster 1.

3. The upper and lower bearing 2a, 2b are thrust bearings with a large axial bearing capacity, so that when the caster 1 is applied for a large axial bearing force, the structure of the upper and lower bearings 2a, 2b of the caster 1 will not be damaged by gravity easily.

4. The screw 4 is locked from bottom to top, so that the head 41 with a smaller thickness faces the installation end of the wheel 6, and so that the external diameter of the wheel 6 will not be limited by the length of the screw 4 that much. After the caster 1 and the shaft 60 of the wheel 6 are installed, they are close to each other to lower the center of gravity, to improve the stability of pushing the cart.

While the invention has been described by means of specific embodiments, numerous modifications and variations could be made thereto by those skilled in the art without departing from the scope and spirit of the invention set forth in the claims.

What is claimed is:
1. A caster structure comprising:
 a bipod including: a main body and two support legs; with the main body having a through hole formed at a middle of the main body, an upper cavity upwardly and concavely framed on a top side of the main body and concentrically configured with the through hole, and a lower cavity downwardly and concavely formed on a bottom side of the main body and concentrically configured with the through hole;
 an upper bearing and a lower bearing, with the upper bearing installed in the upper cavity, with the lower bearing embedded into the lower cavity, with external diameters of the upper and lower bearings being matched with internal diameters of the upper and lower cavities respectively;
 a carrying plate installed at the top side of the main body and covering the upper cavity; with the carrying plate having a screw hole formed at a position corresponding to the through hole;
 a screw having a head and a threaded section, with the head facing downward and passing from bottom to top sequentially through the lower bearing, the through hole and the upper bearing, and then screwing and pressing tightly with a rear end of the screw and the screw hole, wherein the rear end of the screw is passed upwardly to outside from a top of the screw hole; and a nut passing to the outside together with the screw out from the top of the screw hole, disposed adjacent with the carrying plate, and pressing the carrying plate tightly.

2. The caster structure of claim 1, further comprising a protrusion formed between a middle position of an internal bottom of the upper cavity and an edge of the through hole, wherein a limiting interval is formed on the internal bottom of the upper cavity and from the middle position to an inner wall on a side of the upper cavity; and a conical abutting surface downwardly protruded from a bottom side of the carrying plate and at a periphery of the screw hole, with a middle portion of the conical abutting surface embedded into the upper bearing, and with a portion of the conical abutting surface pressed by a top end of the upper bearing.

3. The caster structure of claim 2, wherein the carrying plate has a groove downwardly and concavely formed on a top side of the carrying plate and disposed at a position on the periphery of the screw hole for accommodating the nut and the screw after the nut and the screw are screwed and fixed to each other.

4. The caster structure of claim 1, wherein the upper bearing and the lower bearing are thrust bearings, with each comprising an upper ring and a lower ring in a form of a hollow circle and arranged in upper and lower rows, and a plurality of balls installed between the upper ring and the lower ring.

5. The caster structure of claim 4, wherein the screw has a limit ring disposed on an outer wall between the head and the threaded section, wherein the outer wall is a smooth surface, wherein the limit ring has an external diameter matched with an internal diameter of the lower ring of the lower bearing, and wherein internal sidewalls of the limit ring and the lower cavity laterally abut and position inner and outer sidewalls of the lower ring of the lower bearing.

6. The caster structure of claim 5, wherein the screw has a concave hole formed at a distal surface of a rear end of the screw and a punching rod of a punching machine is extended into the concave hole to expand the concave hole, so that an outer wall of the concave hole is expanded to latch with the nut to prevent the nut from rotating and the screw and the nut from being loosened.

* * * * *